United States Patent [19]

Jackson

[11] Patent Number: 4,556,778
[45] Date of Patent: Dec. 3, 1985

[54] ARC WELDING AT HIGH PART SPEEDS
[75] Inventor: Dale E. Jackson, Clay, N.Y.
[73] Assignee: Carrier Corporation, Syracuse, N.Y.
[21] Appl. No.: 672,169
[22] Filed: Nov. 16, 1984

Related U.S. Application Data

[63] Continuation of Ser. No. 399,389, Jul. 19, 1982, abandoned.
[51] Int. Cl.⁴ .............................................. B23K 9/02
[52] U.S. Cl. ............................ 219/125.11; 219/137 R
[58] Field of Search ........... 219/124.1, 124.32, 125.11, 219/137 R

[56] References Cited

U.S. PATENT DOCUMENTS 3,196,248  7/1965  Cooper et al. ................. 219/125.11
4,142,085  2/1979  Knipstrom et al. ............. 219/137 R

OTHER PUBLICATIONS

American Society for Metals, *Metals Handbook*, 8th Edition, vol. 6, Welding and Brazing, 1971, pp. 203–205.

*Primary Examiner*—C. L. Albritton
*Assistant Examiner*—Alfred S. Keve
*Attorney, Agent, or Firm*—David J. Zobkiw

[57] ABSTRACT

A method of joining together two relatively thin work pieces by arc welding is disclosed. The work pieces are rotated relative to a welding electrode so that the welding electrode is moved at relatively high speed over a path of contact between the work pieces where the weld is to be made. The power density at the work pieces is controlled so that it is necessary to make several passes of the electrode over the path of contact between the work pieces to make the weld. This welding procedure produces a weld of high quality without the use of complex current programming which is required when using conventional arc welding procedures.

7 Claims, 1 Drawing Figure

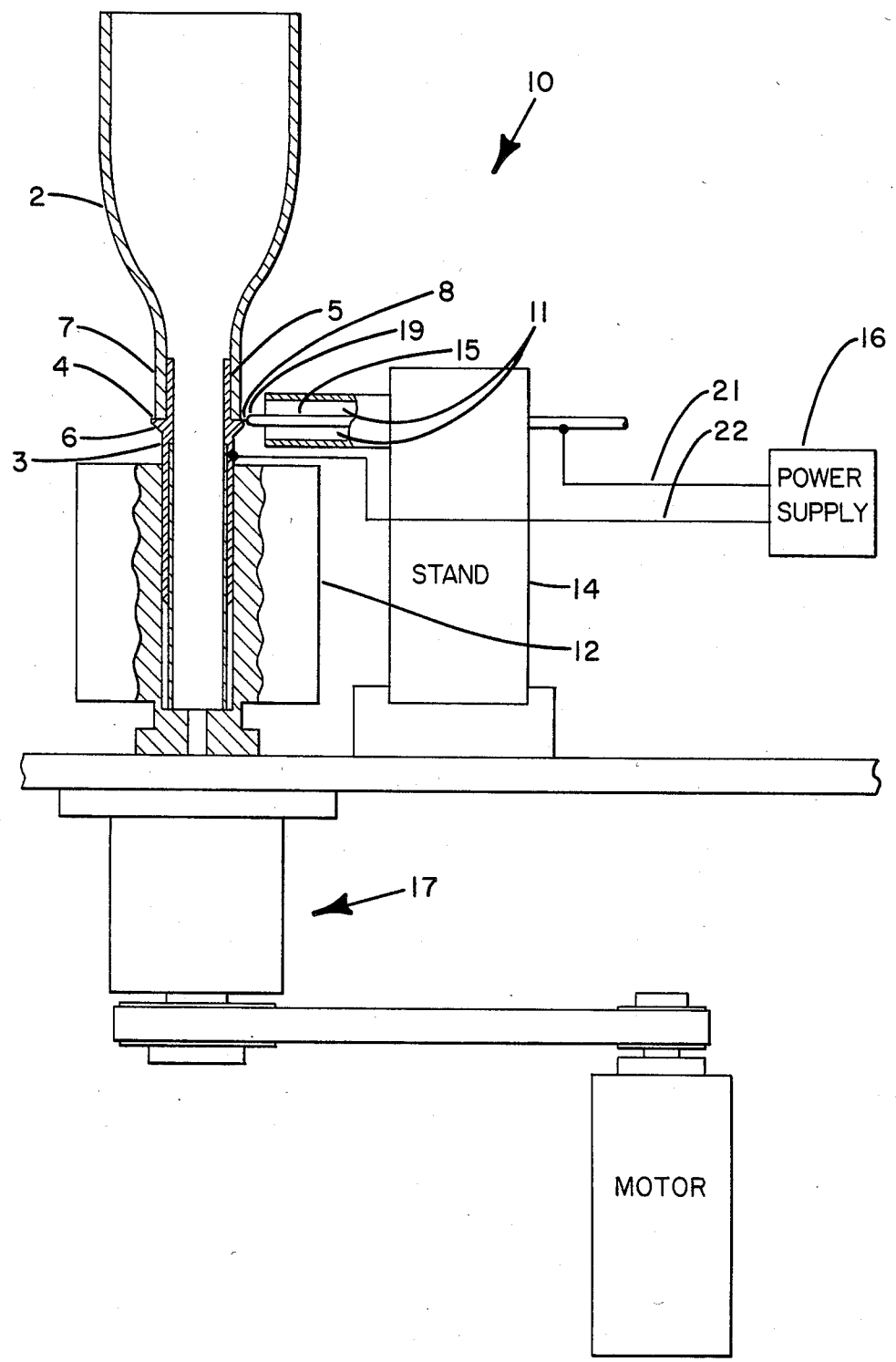

ARC WELDING AT HIGH PART SPEEDS

This application is a continuation of application Ser. No. 399,389 filed July 19, 1982 and now abandoned.

BACKGROUND OF THE INVENTION

The present invention relates to a method of joining two work pieces and more particularly relates to a method of joining two work pieces by arc welding.

In many conventional alternating current (AC) and direct current (DC) arc welding processes, first a path of contact is formed between selected surfaces of two work pieces. Then, at a point along the path of contact of the work pieces, a welding electrode is positioned relative to the work pieces to form an arc gap between the electrode and the work pieces. Usually an inert gas is supplied at the arc gap to provide an atmosphere which is suitable for electron flow across the arc gap. Then, a voltage is supplied across the arc gap to create a flow of electrons across the gap which provides a flow of power to the work pieces. The relative positions of the electrode and the work pieces are changed to make a single pass of the electrode over the path of contact of the work pieces while sufficient power is supplied to the work pieces to melt the material of the work pieces beneath the electrode. After the electrode has passed, the work pieces are welded together along their path of contact by dolidification of the melted material of the work pieces.

In conventional arc welding processes such as described above, sometimes precise control of the power density level at the work pieces is required, especially when welding relatively thin work pieces, to avoid overheating the work pieces since such overheating may result in a weld of poor quality. For example, if the work pieces are overheated, the resultant weld may be easily broken and/or the weld may not last very long when used under normal operating conditions. Also, the weld may not be fluid tight. Therefore, complex current programming of the arc welding power supply is used to precisely control the power density level at the work pieces. This current programming is achieved by using relatively complex, costly, and difficult to operate electronic components as part of the arc welding power supply. In order to maximize the versitility of the power supply, the current programming and corresponding electronics must be adjustable so that power density levels at the work pieces can be changed when welding different kinds of materials and when welding work pieces having different dimensions such as different thicknesses.

SUMMARY OF THE INVENTION

Therefore, it is an object of the present invention to provide a relatively simple and efficient method of arc welding.

It is another object of the present invention to provide a relatively reliable and inexpensive method of arc welding.

It is a further object of the present invention to join two relatively thin work pieces by arc welding without current programming of the arc welding power supply.

These and other objects of the present invention are attained by a method of arc welding which comprises holding two work pieces together to form a path of contact between two surfaces of the work pieces, and positioning an arc welding electrode relative to the work pieces to form an arc gap between the tip of the electrode and the work pieces at a point along the path of contact between the work pieces. An atmosphere suitable for electron flow is provided at the arc gap by supplying inert gas to the arc gap. Then, a voltage is supplied across the arc gap sufficient to create a flow of electrons across the arc gap which provides a power flow to the work pieces while the relative positions of the electrode and the work pieces are changed to supply this power to the work pieces along their path of contact. The speed of relative movement of the electrode and the work pieces is adjusted to provide a power density level at the work pieces which is sufficient to melt the work pieces but which is less than a predetermined power density level at which overheating of the work pieces is possible. The magnitude of the power flow to the arc gap and the speed of relative movement of the electrode and the work pieces are controlled, and the electrode is repeatedly moved over the contact path a number of times, to achieve a cumulative power flow (total energy delivered) to the work pieces which is sufficient to weld the work pieces together along their contact path. By using this process a weld of unusually high quality is formed without the necessity of using complex current programming with the arc welding power supply. Current programming is not required because the power density level at the work pieces is controlled by adjusting the speed of relative movement of the electrode and the work pieces while the desired cumulative power flow to the work pieces is achieved by adjusting the number of passes of the electrode over the work pieces, the magnitude of the power supplied to the arc gap, and the speed of relative movement of the electrode and the work pieces.

BRIEF DESCRIPTION OF THE DRAWINGS

Other objects and advantages of the present invention will be apparent from the following detailed description in conjunction with the accompanying drawing, in which:

The FIGURE shows an arc welding system for welding together two work pieces according to the principles of the present invention.

DESCRIPTION OF THE PREFERRED EMBODIMENT

Referring to the figure, an arc welding system 10 for welding together a first work piece 2 and a second work piece 3, according to the principles of the present invention, is shown. The arc welding system 10 comprises a rotatable work piece holder 12, a stand 14 for supporting a welding electrode 15, a power supply 16, and a motor unit 17 for rotating the holder 12 relative to the welding electrode 15. The welding electrode 15 is made of tungsten or any other such suitable electrode material. The arc welding system 10 is particularly suitable for welding together work pieces 2 and 3 which are configured and/or made of a material, such as thin aluminum, which would normally require complex current programming of an arc welding power supply if the work pieces 2 and 3 were to be welded together according to conventional welding techniques. However, if desired, the system 10 may be used to weld together work pieces 2 and 3 of any type.

The work pieces (parts) 2 and 3 may have any of a large number of shapes and may be held together in any of a variety of manners by the holder 12 to form a path of contact 4 between two surfaces of the work pieces 2 and 3. For example, as shown in the figure, the work pieces 2 and 3 are relatively thin-walled tubular members with the first work piece 2 having a cylindrical bottom portion 7 with an inside diameter slightly greater than the outside diameter of a cylindrical top part 5 of the second work piece 3 so that the first work piece 2 may be snuggly fitted over the second work piece 3. In addition, the second work piece 3 has a skirt portion 6 designed to support the bottom edge of the bottom portion 7 of the first work piece 2 to aid in holding the work pieces 2 and 3 together in the desired manner.

In operation, the work pieces 2 and 3 are supported by the holder 12 so that the path of contact 4 between the surfaces of the work pieces 2 and 3 is in line with and adjacent to a tip portion 19 of the electrode 15. Also, the work pieces 2 and 3 are supported in the holder 12 to position the electrode 15 relative to the path of contact 4 between the work pieces 2 and 3 to form an arc gap 8 between the tip portion 19 of the electrode 15 and the path of contact 4 of the work pieces 2 and 3. Inert gas is supplied from an inert gas supply (not shown) to the arc gap 8 via passageways 11 in the electrode section of the stand 14. The inert gas at the arc gap 8 provides an atmosphere suitable for electron flow between the top portion 19 of the electrode 15 and the work pieces 2 and 3.

The work piece holder 12 is rotated by the motor unit 17 to rotate the work pieces 2 and 3 relative to the electrode 15. The position of the work pieces 2 and 3 is changed relative to the tip portion 19 of the electrode 15 so that the electrode 15 continuously passes over the path of contact 4 of the work pieces 2 and 3. As the work pieces 2 and 3 are rotated, the power supply 16 supplies a voltage across the arc gap 8 sufficient to create a flow of electrons across the arc gap 8 providing a power flow to the work pieces 2 and 3. Electrical leads 21 and 22 electrically connect the power supply 16 to the electrode 15 and the work pieces 2 and 3, respectively.

The power density level at the work pieces 2 and 3 is the amount of power per unit area delivered to the surface area of the work pieces 2 and 3 exposed to the electron flow. For a given fixed power output from the power supply 16 the power density level at the work pieces 2 and 3 is determined from the amount of surface area exposed to the electron flow and the speed of relative movement of the electrode 15 and the work pieces 2 and 3. This power density level may be increased by decreasing the speed of rotation of the work pieces 2 and 3 relative to the electrode 15. Alternatively, this power density level may be decreased by increasing the speed of rotation of the work pieces 2 and 3 relative to the electrode 15.

According to the present invention, a known power flow is provided by the power supply 16, and the speed of rotation of the work pieces 2 and 3 is controlled by the motor unit 17, to provide a selected power density level at the work pieces 2 and 3 which is sufficient to melt the work pieces 2 and 3 along their path of contact. However, problems associated with overheating the work pieces 2 and 3 are eliminated by selecting a power density level which is less than a predetermined power density level at which overheating of the work pieces 2 and 3 is possible. This predetermined power density level depends on physical characteristics, such as thickness and kind of material, of the particular work pieces 2 and 3 and may be determined by trial and error or by calculations based on the heat transfer properties and other such characteristics of the particular work pieces 2 and 3.

Usually, in order to prevent overheating of relatively thin-walled work pieces 2 and 3, it is necessary to select a power density level which is relatively low so that one pass of the electrode 15 over the path of contact 4 between the work pieces 2 and 3 is not sufficient to make a high quality (strong, durable, fluid tight) weld between the work pieces 2 and 3. Instead, repeated passes of the electrode 15 over the path of contact 4 are required to achieve a cumulative power flow to the work pieces 2 and 3 which is sufficient to completely and properly weld the work pieces 2 and 3 together along their path of contact 4. This cumulative power flow to the work pieces 2 and 3 is the total amount of energy delivered to the work pieces 2 and 3 during the welding process.

From a physical standpoint, as the welding electrode 15 passes over the contact path 4 there is some melting of the work pieces 2 and 3 and then some subsequent solidification of the melted portions of the work pieces 2 and 3 after the electrode 15 has passed. However, usually in order to prevent overheating it is necessary to control the power density level by adjusting the magnitude of the power flow and the speed of rotation of the work pieces 2 and 3 so that the amount of material melted and solidified during a single pass is not sufficient to make a high quality weld between the work pieces 2 and 3. By making multiple passes of the electrode 15 over the path of contact 4 enough melting and solidification is achieved to form a high quality weld between the work pieces 2 and 3. In effect, individual weld sections are gradually fused together at relatively low power density levels. This should be compared to conventional arc welding processes in which work pieces are welded together with a single pass of an electrode over a contact path between the work pieces. In effect, individual weld sections are instantaneously fused together at relatively high power density levels. In these conventional processes, the power density level at the work pieces is controlled by current programming of the power supply to provide a current flow of predetermined characteristics. This current programming is usually fairly complex because the power flow to the work pieces must be sufficient to weld together the work pieces during a single pass of the electrode without overheating the work pieces. Also, the current programming must account for variations in material thicknesses and other such factors if a high quality weld is to be made. In addition, the current programming should provide a desired cumulative power flow to the work pieces.

It should be noted that, when arc welding according to the principles of the present invention, it has been observed that a high quality weld is made if cumulative power flow to the work pieces 2 and 3 is approximately equal to the cumulative power flow necessary to make a high quality weld when arc welding according to a conventional, single pass arc welding process. Thus, in most situations it is desirable to adjust the magnitude of power flow to the work pieces 2 and 3, the speed of rotation of the work pieces 2 and 3, and the number of rotations of the work pieces 2 and 3, to achieve a cumulative power flow which is approximately equal to the cumulative power flow necessary to weld the work pieces 2 and 3 together with only one pass of the electrode 15 over the contact path 4 between the work pieces 2 and 3. Of course, the particular cumulative power flow selected will depend on the specific properties and configurations of the particular work pieces 2 and 3 which are to be welded together.

Also, it should be noted that the present invention is particularly suited for arc welding relatively thin walled aluminum work pieces with an alternating current (AC) power supply. For example, the work pieces 2 and 3 may be aluminum tubes each having approximately a 2.35 inch circumference with 1/16 inch walls. A high quality weld may be made at conventional power flow levels (125 amps RMS) if the aluminum tubes are rotated at 75 revolutions per minute for approximately 18 seconds. This speed of rotation is approximately 15 times normal part speeds in conventional AC arc welding processes.

Further, it should be noted that the arc welding system 10 may be adjusted to accommodate different types of materials and different thicknesses of materials by simply adjusting the speed of rotation of the work pieces 2 and 3 relative to the electrode 15. Also, the power output of the power supply 16 may be adjusted in conjunction with the part speeds to aid in providing the desired power density level at the work pieces 2 and 3. Thus, the arc welding system 10 may accommodate various kinds of materials and various types of parts having different masses, thicknesses, and configurations.

Still further, it should be noted that the arc welding process according to the present invention may be used with an alternating current (AC) or direct current (DC) power supply 16. Also, in certain situations, it may be desirable to provide some relatively simple current programming, in addition to operating the system 10 at high part speeds, to make welds of exceptionally high quality.

Therefore, while the present invention has been described in conjunction with a particular embodiment it is to be understood that various modifications and other embodiments of the present invention may be made without departing from the scope of the invention as described herein and as claimed in the appended claims.

What is claimed is:

1. A method of joining two work pieces by arc welding which comprises the steps of:
    holding the work pieces together to form a path of contact between two surfaces of the work pieces;
    positioning a tungsten containing arc welding electrode relative to the work pieces to form an arc gap between the tip of the electrode and the work pieces at a point along the path of contact between the work pieces;
    changing the relative positions of the work pieces and the electrode to repeatedly move the tip of the electrode over the path of contact between the work pieces;
    supplying inert gas at the arc gap to provide an atmosphere at the arc gap which is suitable for electron flow across the arc gap;
    supplying a voltage across the arc gap sufficient to create a flow of electrons across the arc gap which provides a power flow to the work pieces;
    adjusting the speed of relative movement of the electrode and the work pieces to a rate which provides a power density level at the work pieces which is sufficient to melt the work pieces as the tip of the electrode moves over the path of contact between the work pieces while permitting some subsequent solidification of the melted portions after the tip of the electrode has passed and which is less than a predetermined power density level at which overheating of the work pieces is possible; and
    controlling the number of times the electrode passes over the contact path between the work pieces to repeatedly cause melting and some subsequent solidification of the work pieces, the magnitude of the power supplied to the arc gap, and the speed of relative movement of the electrode and the work pieces, to provide a cumulative power flow to the work pieces which is sufficient to gradually weld the work pieces together along their path of contact.

2. A method of joining two work pieces as recited in claim 1, wherein the step of controlling the number of times the electronic passes over the contact path between the work pieces, the magnitude of the power supplied to the arc gap, and the speed of relative movement of the electrode and the work pieces, results in a cumulative power flow to the work pieces which is approximately equal to the cumulative power flow necessary to weld the work pieces together with only one pass of the electrode over the path of contact between the work pieces.

3. A method of inert gas arc welding across an arc gap between an electrode and a path of contact between two relatively thin work pieces, which comprises the steps of:
    supplying a voltage across the arc gap sufficient to create a flow of electrons across the arc gap which provides a power density level at the work pieces which is sufficient to melt the work pieces;
    changing the relative positions of the work pieces and the electrode to move the electrode over the path of contact between the work pieces and to adjust the power density level at the work pieces to a selected level which is sufficient to melt the work pieces as the electrode moves over the path of contact between the work pieces while permitting some subsequent solidification of the melted portions after the electrode has passed, which is less than a predetermined power density level at which overheating of the work pieces is possible, and which is not sufficient to make a high quality weld with only one pass of the electrode over the path of contact between the work pieces; and
    repeatedly moving the electrode over the path of contact between the work pieces a preselected number of times to repeatedly cause the melting and some subsequent soldification of the work pieces and to provide a cumulative power flow to the work pieces which is sufficient to make a high quality weld between the work pieces.

4. A method of joining two thin-walled work pieces by arc welding which comprises the steps of:
    holding the work pieces together to form a path of contact between two surfaces of the work pieces;
    positioning a non-consumable arc welding electrode relative to the work pieces to form an arc gap between the tip of the electrode and the work pieces at a point along the path of contact between the work pieces;
    changing the relative positions of the work pieces and the electrode to repeatedly move the tip of the electrode over the path of contact between the work pieces;

supplying inert gas at the arc gap to provide an atmosphere at the arc gap which is suitable for electron flow across the arc gap;

supplying a voltage across the arc gap sufficient to create a flow of electrons across the arc gap which provides a power flow to the work pieces;

adjusting the speed of relative movement of the electrode and the work pieces to a rate which provides a power density level at the work pieces which is sufficient to melt the work pieces as the tip of the electrode moves over the path of contact between the work pieces while permitting some subsequent solidification of the melted portions after the tip of the electrode has passed and which is less than a predetermined power density level at which overheating of the work pieces is possible; and controlling the number of times the electrode passes over the contact path between the work pieces to repeatedly cause melting and some subsequent solidification of the work pieces, the magnitude of the power supplied to the arc gap, and the speed of relative movement of the electrode and the work pieces, to provide a cumulative power flow to the work pieces which is sufficient to gradually weld the work pieces together along their path of contact.

5. A method of joining two thin-walled work pieces as recited in claim 4, wherein the step of controlling the number of times the electrode passes over the contact path between the work pieces, the magnitude of the power supplied to the arc gap, and the speed of relative movement of the electrode and the work pieces, results in a cumulative power flow to the work pieces which is approximately equal to the cumulative power flow necessary to weld the work pieces together with only one pass of the electrode over the path of contact between the work pieces.

6. A method of joining two thin-walled work pieces as recited in claim 5 wherein the thin-walled work pieces are aluminum.

7. A method of inert gas arc welding across an arc gap between a non-consumable electrode and a path of contact between two relatively thin work pieces, which comprises the steps of:

supplying a voltage across the arc gap sufficient to create a flow of electrons across the arc gap which provides a power density level at the work pieces which is sufficient to melt the work pieces;

changing the relative positions of the work pieces and the electrode to move the electrode over the path of contact between the work pieces and to adjust the power density level at the work pieces to a selected level which is sufficient to melt the work pieces as the electrode moves over the path of contact between the work pieces while permitting some subsequent solidification of the melted portions after the electrode has passed, which is less than a predetermined power density level at which overheating of the work pieces is possible, and which is not sufficient to make a high quality weld with only one pass of the electrode over the path of contact between the work pieces; and repeatedly moving the electrode over the path of contact between the work pieces a preselected number of times to repeatedly cause the melting and some subsequent solidification of the work pieces and to provide a cumulative power flow to the work pieces which is sufficient to make a high quality weld between the work pieces.

* * * * *